United States Patent
Gore et al.

(10) Patent No.: US 11,966,740 B2
(45) Date of Patent: Apr. 23, 2024

(54) USE OF MULTIPLE DIFFERENT VARIANTS OF FLOATING POINT NUMBER FORMATS IN FLOATING POINT OPERATIONS ON A PER-OPERAND BASIS

(71) Applicant: Graphcore Limited, Bristol (GB)

(72) Inventors: Mrudula Gore, Bath (GB); Alan Alexander, Wotton-Under Edge (GB)

(73) Assignee: Graphcore Limited, Bristol (GB)

( * ) Notice: Subject to any disclaimer, the term of this patent is extended or adjusted under 35 U.S.C. 154(b) by 53 days.

(21) Appl. No.: 17/444,788

(22) Filed: Aug. 10, 2021

(65) Prior Publication Data
US 2022/0107805 A1   Apr. 7, 2022

(30) Foreign Application Priority Data
Oct. 7, 2020 (GB) ..................... 2015897

(51) Int. Cl.
*G06F 9/30* (2018.01)
*G06N 3/02* (2006.01)

(52) U.S. Cl.
CPC ........ *G06F 9/3013* (2013.01); *G06F 9/30025* (2013.01); *G06F 9/30105* (2013.01); *G06N 3/02* (2013.01)

(58) Field of Classification Search
CPC .... G06F 9/3013; G06F 9/30105; G06F 7/483; G06F 2207/3812; G06N 3/02
See application file for complete search history.

(56) References Cited

U.S. PATENT DOCUMENTS

| 4,617,641 A * | 10/1986 | Hamada | G06F 7/48 341/95 |
| 11,029,958 B1 * | 6/2021 | Zhang | G06F 9/3016 |
| 2007/0203967 A1 * | 8/2007 | Dockser | G06F 7/483 708/495 |
| 2007/0299898 A1 * | 12/2007 | Richey | G06F 7/483 708/490 |
| 2009/0094441 A1 * | 4/2009 | Hack | G06F 7/483 712/222 |

(Continued)

FOREIGN PATENT DOCUMENTS

| EP | 3567472 A1 | 11/2019 |
| WO | 2020021395 A1 | 1/2020 |

OTHER PUBLICATIONS

Combined Search and Examination Report dated Mar. 14, 2022 for United Kingdom Patent Application No. GB2015897.8. 9 pages.

*Primary Examiner* — Shawn Doman
(74) *Attorney, Agent, or Firm* — Haynes and Boone, LLP

(57) ABSTRACT

A processor comprising: a register file comprising a group of operand registers for holding data values, each operand register being a fixed number of bits in length for holding a respective data value of that length; and processing logic comprising floating point logic for performing floating point operations on data values in the register file, the floating point logic is configured to process the fixed number of bits in the respective data value according to a floating point format comprising a set of mantissa bits and a set of exponent bits. The processing logic is operable to select between a plurality of different variants of the floating point format, at least some of the variants having a different size sets of mantissa bits and exponent bits relative to one another.

19 Claims, 4 Drawing Sheets

(56) References Cited

U.S. PATENT DOCUMENTS

| | | | |
|---|---|---|---|
| 2010/0023568 A1* | 1/2010 | Hickey | G06F 9/30189 |
| | | | 708/209 |
| 2011/0004644 A1* | 1/2011 | Henry | G06F 9/30014 |
| | | | 708/231 |
| 2012/0233444 A1* | 9/2012 | Stephens | G06F 9/3016 |
| | | | 712/210 |
| 2018/0262205 A1* | 9/2018 | Li | G06F 7/57 |
| 2019/0304054 A1* | 10/2019 | Appu | G06F 9/3001 |
| 2020/0097799 A1* | 3/2020 | Divakar | G06N 3/08 |
| 2021/0142155 A1* | 5/2021 | James | G06N 3/084 |
| 2021/0287423 A1* | 9/2021 | Guenther | G06T 1/20 |
| 2022/0050665 A1* | 2/2022 | Ferrere | G06F 7/509 |

* cited by examiner

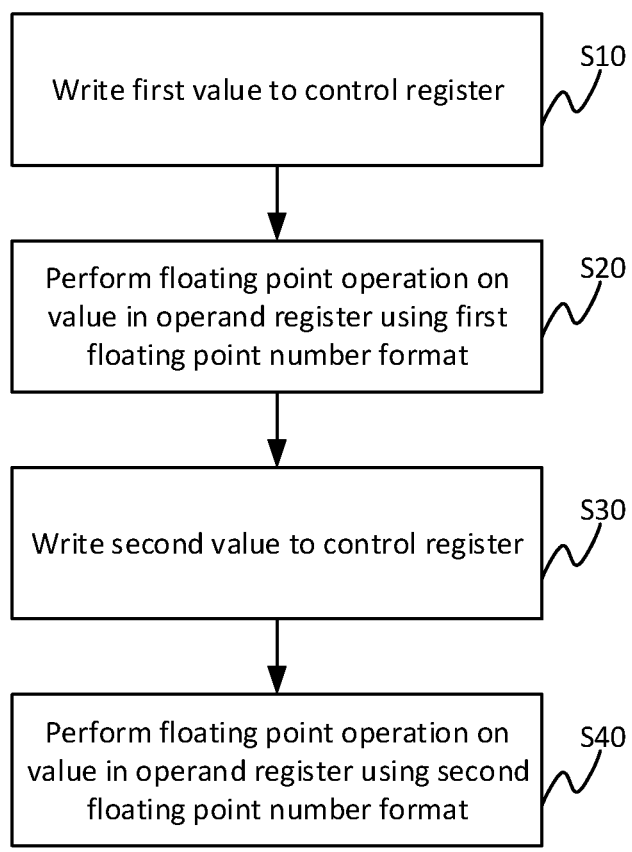

at least one of the operations operates on two or more of the floating point data values from a respective two or more different ones of the group of operand registers, and wherein the floating point logic is operable to apply a different one of the variants of the floating point number format to at least some of the data values operated on by a same operation  S50

Fig. 5 at least one of the floating point operations comprises at least one item selected from a list consisting of:

- combining the first one of the data values with a value from another register, wherein the other register has a different size than a fixed length of the operand registers in the group; and

- placing a result of the floating point operation in a further register having a different size than the fixed length of the operand registers.

 S60

Fig. 6

USE OF MULTIPLE DIFFERENT VARIANTS OF FLOATING POINT NUMBER FORMATS IN FLOATING POINT OPERATIONS ON A PER-OPERAND BASIS

CROSS-REFERENCE TO RELATED APPLICATIONS

The present application claims priority to United Kingdom Patent Application No. GB2015897.8, filed on Oct. 7, 2020, the disclosure of which is hereby incorporated herein by reference in its entirety.

TECHNICAL FIELD

The present disclosure relates to computer number formats for representing and operating upon floating point numbers in a computer's processor.

BACKGROUND

A number format is a format for representing a number in a computer architecture. A number may be held in a register as a group of bits, where the register has some fixed architectural width, e.g. 8 bits, 16 bits or 32 bits, and different subgroups of the bits at different positions within the register (i.e. different fields of the register) are used to represent different properties of the number format. E.g. in the simple example of a signed integer, the properties are sign and magnitude. The logic in the processing unit of the computer is configured with hard-wired knowledge of which predetermined fields represent which property of the number format, and to process the bits of those fields accordingly. For instance, to represent a signed integer, the first (most significant) bit position in the register may be used to hold a sign bit representing the sign of the number, and the rest of the bits may be used to represent the magnitude of the number.

A floating point number format typically comprises three fields: i) a single-bit sign field for holding a sign bit, ii) an exponent field for holding a set of exponent bits representing an exponent, and iii) a mantissa field for holding a set of mantissa bits representing a mantissa (also called the significand). The format is a way of representing a binary number equal in value to $(-1)^S \times (M+1) \times 2^{E-b}$, where S is the sign bit, M is the mantissa, E is the exponent and b is a bias (which could in principal be 0 in some systems, though conventionally is not). The bias is typically implicit, as are the base of 2 and the leading 1 before the decimal place. In some number formats the leading 1 is implicit unless all the bits of the mantissa are zero, in which case it becomes a leading 0.

The width of the mantissa field determines the precision of the number format and the width of the exponent field along with any bias determines its range. The fields of the number format need to fit within the finite number of bits of the fixed width of the register (e.g. if it is a 16-bit register width, the total number of bits taken up by the sign bit, exponent field and mantissa field must be no more than 16). Different system designers have selected floating point number formats having different sized mantissa and exponent fields. For instance, consider a 16-bit floating point number format. As a matter of notation the number of sign, exponent and mantissa bits of a given format may be expressed as sign:exponent:mantisa respectively. The IEEE standard is 1:5:10. Another format is known as DLFloat which has format 1:6:9. Another known as bfloat16 has format 1:8:7.

SUMMARY

Conventionally the fields of a given number format are each fixed length at fixed positions within the register. The designer of a given computer architecture just has to pick a number format at the design stage to be hardwired, and then any developers or users of any system built on that architecture must simply always use this fixed number format.

In contrast, according to one aspect disclosed herein, there is provided a processor comprising: at least one register file comprising a group of operand registers for holding data values loaded from memory or to be stored back to memory, each operand register being a fixed number of bits in length for holding a respective data value of said length; and processing logic comprising floating point logic for performing floating point operations on data values in the register file. For the data value held in each operand register upon which one of the floating point operations is to be performed, the floating point logic is configured to process the fixed number of bits in the respective data value according to a floating point format comprising a set of mantissa bits and a set of exponent bits. The processing logic is further operable to select between a plurality of different variants of the floating point format, at least some of the variants having a different size sets of mantissa bits and exponent bits relative to one another.

The operation may for example be a reciprocal, square root, addition, subtraction, multiplication, division, or multiply-accumulate (MAC) where at least one operand of the operation is a floating point value.

The present disclosure thus provides a flexible floating point format which enables a variable trade-off between range and precision.

In embodiments, the processor may further comprise at least one control register for holding one or more programmable settings, wherein the selected variant of the floating point number format may be specified by at least one of the a programmable settings as determined from the at least one control register.

In such embodiments, the programmable setting(s) is/are programmable by code run on the processor, e.g. by executing a put instruction to put the value(s) of the one or more settings to the control register(s), or a load instruction to load the value(s) from memory into the control register(s).

In embodiments, the variants may comprise one variant where the size of the set of exponent bits is zero, and at least one other variant where both the size of the set of exponent bits is non-zero and the size of the set of mantissa bits is non-zero.

In embodiments, the variants may comprise one variant where the size of the set of mantissa bits is zero, and at least one other variant where both the size of the set of mantissa bits is non-zero and the size of the set of exponent bits is non-zero.

In embodiments, at least one of variants of the floating point format further comprises a single sign bit.

In embodiments, the variants may comprise at least one variant having a single sign bit and at least one variant having no sign bit.

In embodiments, the variants may consist of all possible combinations of the sizes of the sets of mantissa and exponent bits filling said fixed number of bits with the sign, mantissa and exponent bits; ranging from one sign bit, zero exponent bits and the rest as mantissa bits; to one sign bit, zero mantissa bits and the rest as exponent bits.

Alternatively, the variants may consist of only a subset of possible combinations of the sizes of the sets of mantissa and exponent bits within said fixed number of bits.

In embodiments, the fixed number of bits in length for each operand register in said group may be eight bits.

In embodiments, the variants may consist of all possible combinations filing said fixed number of bits, from zero exponent bits and seven mantissa bits, to zero mantissa bits and seven exponent bits.

In other embodiments, the fixed number of bits in length for each operand register in said group may be sixteen bits.

In embodiments, the may variants comprise two of more of the following:
five exponent bits and ten mantissa bits,
six exponent bits and nine mantissa bits,
seven exponent bits and eight mantissa bits, and/or
eight exponent bits and seven mantissa bits.

In embodiments, according to the floating point number format the respective value in binary may be defined as:

$$(-1)^S \times (M+1) \times 2^{(E-b)},$$

where S is the sign bit, M is the mantissa, E is the exponent, and b is a bias.

In such embodiments the 1 in (M+1) may be implicit. It may be fixed, or alternatively it may be implicit unless the value of the set of mantissa bits equals zero. However a different rule regarding this 1 could be used. The base of 2 is also implicit. However it is not excluded that a base other than 2 could be used, e.g. base 10 or 16. The bias is not essential to all possible implementations.

In some cases the processing of the respective data value according to the floating point format may comprise explicitly determining the data value in binary according to said definition. Note however that the floating point logic does not necessarily have to explicitly determine the full binary value of all floating point operands. For instance, two floating point operands can be added by directly adding their mantissas (first shifting one if needed to represent it on the scale of the exponent of the other). Or to perform a floating point multiplication, the mantissas are multiplied while the exponents are added.

In embodiments, at least some of the variants of the number format may have a different value of the bias.

In embodiments the bias could be an independently programmable setting of each variant, settable independently of the programmed mantissa and exponent size. Alternatively the bias, mantissa size and exponent size could be selected together by a single mode setting corresponding to each variant. I.e. so in one mode, the mantissa size, exponent size and bias are set to one combination; and in another mode the mantissa size, exponent size and bias are set to another combination; etc.

Alternatively the bias could be an implicit, fixed value.

The flexible format can be particularly useful in applications where it is desired to combine the represented value with another value (e.g. to add or multiply them) and then store the result as a differently sized (e.g. wider) number format. For instance this could be to combine (e.g. add or multiply) two 16-bit floating point values from two respective 16-bit registers and store the result as a 32-bit floating point value in a 32-bit register. By way of example, consider an application in artificial intelligence (AI). Typically AI algorithms are a sum of many multiplications. So it is useful to have an 'accumulator' that has a range bigger than two multiplicands and accuracy to catch any diminishing cancellations (via addition/subtraction).

Alternatively or additionally, the flexible format can be useful where it is desired to combine (e.g. add or multiply) two values with different length formats. For example this could be to combine (e.g. add or multiply) a 16-bit floating point value with a 32-bit floating point value.

It also saves space to store numbers in a smaller format; if a group of numbers have particularly short range or require less accuracy, it is possible to represent them in smaller format. For example it will be useful to use the same 16 bits as different half precision number formats, by varying sizes of exponent or mantissa fields, or even choosing whether or not to have a sign bit.

Hence in embodiments, at least one of said operations which the floating point logic is configured to perform may comprise one or both of:
combining the respective data value with a value from another register, wherein said other register has a different size than said fixed length of the operand registers in said group; and/or
placing a result of the operation in a further register having a different size than said fixed length of the operand registers in said group, as in S60 of FIG. 6.

In embodiments, depending on the operation being performed, said combination may for example comprise a floating point addition, subtraction, multiplication or addition, or a more complex operation such as a multiply-accumulate (MAC).

In embodiments, at least one of said operations may operate on two or more of the floating point data values from a respective two or more different ones of said group of operand registers, and the floating point logic may be operable to apply a different one of the variants of the floating point number format to at least some of the data values operated on by the same operation, as in S50 of FIG. 5.

In embodiments, the variants of the floating point number format for each of the at least some of the data values may be programmable via the settings in the control register.

In embodiments there could be an individually programmable setting to independently select the individual number format for each operand. Alternatively, the format of the operands could be programmable together by means of a single mode value held in the control register. I.e. in the latter case, in one mode the floating point logic uses one permutation of variants of the number formats for the different operands, and in another mode the floating point logic uses another permutation of the number formats for the different operands.

In embodiments, the floating point logic may be configured to perform each of said operations in response to execution of a single instance of a respective type of machine code instruction in an instruction set of the processor In embodiments, the floating point logic may be operable to apply a different one of the variants of the floating point number format to the data values operated on by at least some different ones of the types of machine code instruction.

In embodiments, the variants of the floating point number format for the data values of the different types of machine code instruction may be programmable via the settings in the control register.

This may be by an individual, independently programmable for each of the machine code instruction types.

According to another aspect disclosed herein, there may be provided a system comprising the processor of any preceding claim, programmed to use one of the data values to represent a weight of a neural network.

In embodiments, the operation programmed to be performed on said one of the data values may comprises: combining the respective data value with a value from another register, wherein said other register may have a different size than said fixed length of the operand registers in said group; and wherein the system may be programmed to use the value in the other register to represent an activation of the node of the neural network.

According to another aspect disclosed herein there may be provided a corresponding method of operating the processor or system of any embodiment disclosed herein.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 4 is a schematic flow chart illustrating a method of using a flexible floating point number format in accordance with embodiments disclosed herein.

FIG. 5 is a schematic flow chart illustrating a method of using a flexible floating point number format in accordance with embodiments disclosed herein.

FIG. 6 is a schematic flow chart illustrating options for floating point operations in accordance with embodiments disclosed herein.

DETAILED DESCRIPTION OF EMBODIMENTS

Figure 1:
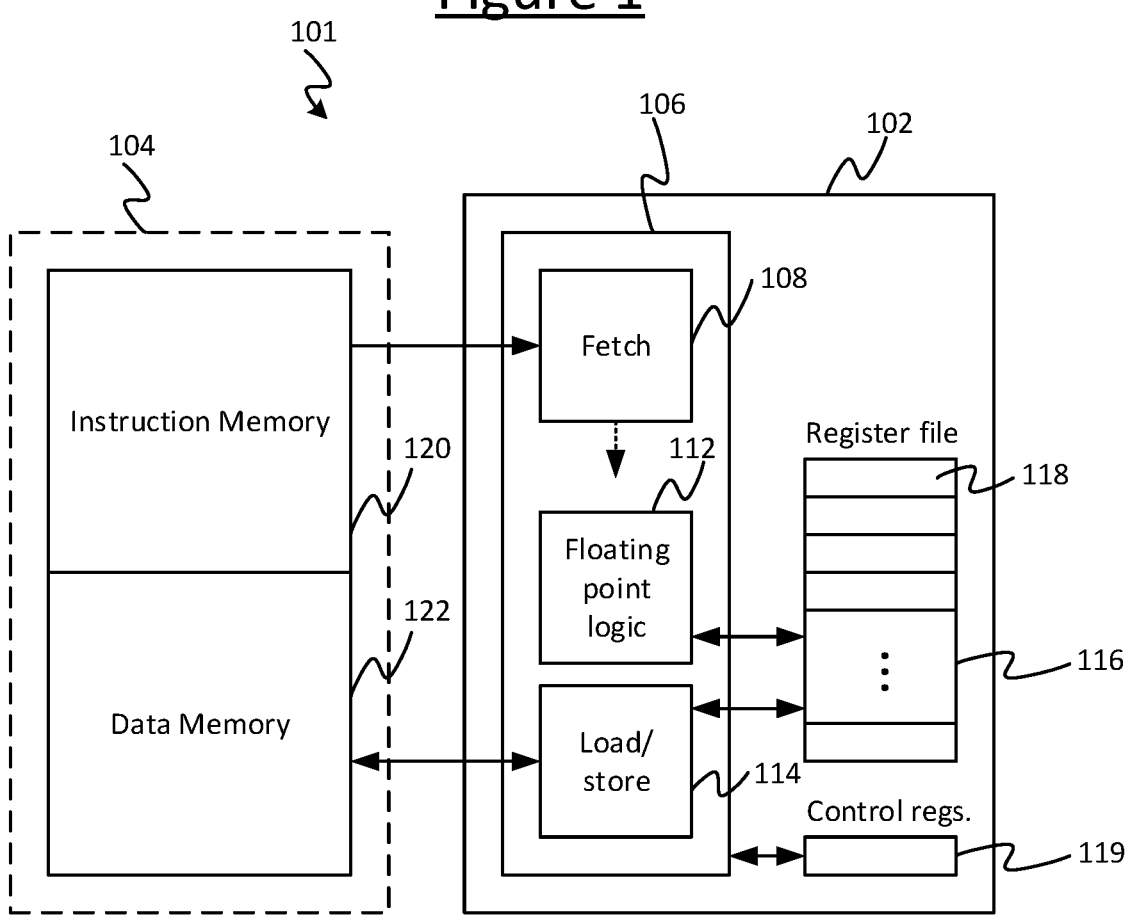
FIG. 1 is a schematic block diagram of a computer system in accordance with embodiments of the present disclosure, FIG. 2 schematically illustrates a flexible 8-bit floating point number format in accordance with embodiments disclosed herein, FIG. 3 schematically illustrates a flexible 16-bit floating point number format in accordance with embodiments disclosed herein.

FIG. 1 illustrates a computer system 101 in accordance with embodiments disclosed herein. The computer system 101 comprises a processor 102 and memory 104. The processor 102 comprises processing logic 106, at least one register file 116, and one or more control registers 119. The processing logic 106 comprises fetch logic 108, floating point logic 112, and load/store logic 114 (also called memory access logic). It may also comprise other pieces of logic (not shown) for performing other aspects of the execution, such as integer arithmetic and register write-back. The register file 116 comprises a group of operand registers, each individual operand register 118 having a fixed length in bits, e.g. 8 bits, 16 bits or 32 bits. The control register(s) 119 could be implemented in another part of the register file 118, or in a separate bank of registers or as a stand alone register. In embodiments the constituent pieces of logic in the processing logic 106—including the fetch logic 108, floating point logic 112 and load/store logic 114—may be arranged in a pipeline. The number of pipeline stages that the logic is divided into, and the order of the stages, are a matter of design choice. Pipelined execution techniques are, in themselves, well known in the art.

The processor 102 may take the form of a general purpose CPU (central processing unit), or an accelerator processor or other application specific processor such as a GPU (graphics processing unit), cryptoprocessor, or AI (artificial intelligence) accelerator processor. The memory 106 may comprise one or more physical memory devices. In embodiments, the computer system 101 may comprise a multi-tile processing unit comprising a plurality of tiles, each tile comprising a respective instance of the processor 102 and memory 104. In some embodiments, the processor 102 or computer system 101 may be arranged as an AI accelerator in order to implement a machine learning model in the form of an artificial neural network and to perform operations of the neural network such as a forward pass or stochastic back propagation, etc.

The memory 106 comprises instruction memory 120 and data memory 122, which may be different regions on the same memory device or different memory devices, or a combination thereof. The memory 106 could be implemented on the same chip as the processor 102 itself, or externally, or a combination of these. The memory 106 may comprise one or more non-volatile storage devices such a ROM (read-only memory), hard drive, solid state drive, flash memory or EEPROM (electronically erasable and programmable ROM); and/or one or more volatile memory devices such as a RAM (random access memory). It may employ a magnetic medium such as a magnetic disk; or an electronic medium such as static RAM, dynamic RAM, NAND flash, NOR flash, etc.; or another form of medium such as an optical storage medium. Also, in embodiments one or more levels of cache (not shown) may be employed between the instruction memory 120 and fetch logic 108, and/or between the data memory 122 and load/store logic 114. Any discussion herein of loading data from data memory or fetching instructions from instruction memory does not exclude that there may be some intermediate caching which, for conciseness, is not described. It will be appreciated that the representation shown in FIG. 1 is somewhat schematized and implementation details such as caching and pipelining will, in themselves, be familiar to a person skilled in the art.

In operation, the instruction memory 120 stores a program (i.e. code) comprising a sequence of instructions to be executed by the processor 102; whilst the data memory 122 stores data to be operated upon by the executed instructions, and data resulting from the executed instructions. The fetch logic 108 fetches each of the sequence of instructions in turn from the instruction memory 120. In embodiments the processor 102 may be a barrel-threaded processor capable of concurrently executing multiple such sequences of instructions (i.e. different threads), in a temporally interleaved manner. For the purpose of the present discussion, a given one such sequence will be considered, but it will be appreciated that other such sequences of instructions could also be being executed concurrently.

An instruction for the present purposes refers to a machine code instruction, i.e. an instance of one of the fundamental instruction types defined in the instruction set of the processor 102, each comprising an opcode and zero or more operand fields. The opcode defines the type of instruction, e.g. add, multiply, load, store, etc. Each instruction type triggers the processing logic 106 of the processor performs a different kind of operation. The operand field(s) specify the data to be operated upon by the instruction, and/or a location to place the result of the operation. Typically the operand field does this by means of a pointer, i.e. the operand field contains a pointer to a register which holds the actual operand value. However some instruction types may instead use immediate operands, where the operand value is directly coded into the instruction's operand field.

For each instruction fetched by the fetch logic 108, the instruction is passed from the fetch logic 108 to be executed by one or more other pieces of processing logic—e.g. floating point logic 112 or load/store logic 114—responsible for executing the type of instruction specified by the instruction's opcode. This may involve passing the instruction along the pipeline in a pipelined arrangement.

If the instruction is a load instruction, it takes at least two operands: a source operand specifying a source memory address in the data memory 122, and a destination operand specifying a destination register 118 in the register file 116 (or one of the register files). The instruction acts on the load/store logic 114 causing it to load a word of data from the source address in the data memory 122 and place it in the destination register 118 in the register file 116.

If the instruction being executed is a floating point instruction corresponding to a type of floating point operation, it takes at least one operand: a source operand specifying at least one floating point value to be operated upon by the floating point operation. This may be specified by specifying a destination register 118 in the register file 116 in which the operand value to be operated upon is currently held. This operand value may have been loaded into that register 118 by a previously-executed load instruction in the sequence. Examples of single operand floating point instructions include instructions for conversion from one format to other, or performing non-linear functions like reciprocal or square-root. For some types of floating point instruction, the floating point instruction may take multiple such source operands specifying multiple operands which are to be combined by the operation, e.g. as in an add or multiply instruction, etc. One, some or all of the source operand values may be floating point values, depending on the type of instruction. The floating point instruction may also take a destination operand specifying a destination register 118 in the register file 116 in which to place the result of the operation.

If the instruction being executed is a store instruction, it takes at least two operands: a source operand specifying a source register 118 in the register file 116, and a destination operand specifying a destination memory address in the data memory 122. The store instruction acts on the load/store logic 114 to cause it to store the value currently held in the source register 118 into the destination address in memory 122. This may be a result previously stored in that register 118 by a previously-executed floating point instruction in the sequence.

Each register 118 in the register file 116 has a certain fixed width which may be defined by the architecture of the processor 102. The floating point logic 112 is configured so as, for each floating point value in one of these registers 118 to be operated upon by a floating point operation, to interpret the bits in that register as being composed of a plurality of different fields at different bit-positions, representing different properties of the value according to floating point number format. Specifically, the floating point format comprises: a single-bit sign field, an exponent field, and a mantissa field. According to the floating point format, these are taken to represent a binary value equal to:

$$(-1)^S \times (M+1) \times 2^{(E-b)}$$

where S is the sign bit, M is the mantissa, E is the exponent, b is a bias, "x" represents a multiplication and "^" means raised to the power of. The bias b may be fixed and implicit, and could be zero in some implementations. Alternatively in some embodiments disclosed herein the bias could be programmable. The 1 in (M+1) may be implicit. It may be fixed. Alternatively this 1 may be implicit unless the value of the mantissa is zero (all the mantissa bits are zero) in which case it is taken to be zero instead of 1. I.e. the value of the floating point number is:

$$(-1)^S \times (M+1) \times 2^{(E-b)}$$

when E !=0, and $$(-1)^S \times M \times 2^{(E-b)}$$

when E==0 where "!=" means not equal to, and "==" means is equal to. Other behaviours are also possible in alternative implementations. E.g. the formula could simply be fixed as $(-1)^S \times M \times 2^{(E-b)}$. Or an unsigned floating point format could be used with formula $M \times 2^{(E-b)}$ or $(M+1) \times 2^{(E-b)}$, having no sign bit. The base of 2 is also implicit, though in alternative implementations it is not excluded that a different base could be used, e.g. 10 or 16.

By being configured to interpret values in accordance with the floating point number format, this means that the floating point logic 112 is configured to perform floating point operations on the values in registers 118 in accordance with this format, and/or place the values resulting from such operations in the registers 118 in accordance with this format. For instance, to perform an add operation to add two floating point values, the floating point logic 112 bit-shifts the mantissa of one or both of the source operands left or right so as to represent them on the same scale (i.e. with the same exponent), and then adds the mantissas. Or to multiply two floating point values, the floating point logic 112 multiplies the mantissas and adds the exponents. Note therefore that the floating point logic 112 does not necessarily have to explicitly evaluate the above formula per se (though it may do for some operations), but rather performs floating point operations on the formatted values in accordance with the meanings of the different fields of the floating point format.

Other forms of floating point operation are also known in the art, e.g. subtraction, division, square root, etc. In embodiments such an operation may be performed in response to the execution of a single machine code instruction. More complex floating point instructions are also known, such as a multiply-accumulate instruction which adds the product of two source operands to a third all in a single machine code instruction. The present disclosure can apply to any form of floating point operation performed in response to one or more machine code instructions.

Conventionally a processor is hard-wired to only use one specific floating point number format for a given register size. E.g. a processor designed in accordance with the IEEE standard is hard-wired to use the format 1:5:10 (sign: exponent:mantissa) and can never use any other format.

According to the present disclosure on the other hand, the floating point logic 112 is configured to use a flexible floating point number format. In the preferred embodiments, this means the floating point number format used by the floating point logic 112 is variable during operation of the processor 102 in dependence on at least one programmable value set in at least one of the control registers 119 of the processor 102. The following will be described in terms of such embodiments, but it is not excluded that in other versions of the following techniques the format could be configured in some other way, for instance as a mode of the processor 102 which may be set by a user or configured on the assembly line during assembly of a device which includes the processor 102, e.g. by means of a switch or fuse latch.

Depending on implementation, the floating point format could be used in the source registers, destination registers or both. E.g. it may be used in the sources for operations of multiply and add (accumulate) and the destination for down conversion from a larger fixed format to flexible float.

When the floating point logic 112 receives a floating point instruction to execute, it queries the control register 119 to check the value of the setting currently held therein. The floating point logic 112 then performs the floating point operation on its respective operand values(s) in the relevant operand register(s) 118 (as pointed to by the operand fields of that instruction) according to the variant of the floating point number format specified by the setting currently found in the control register 119. For instance, say the floating point instruction is a multiply instruction which operates on two source operand values in two respective operand registers 118 in the register file 116. The floating point multiplication is performed by multiplying the mantissas and adding the exponents. So to do this the floating point logic 112 needs to know what bits in each operand register 118 are the mantissa field and what bits are the exponent field. Conventionally these fields would simply be fixed, but in accordance with embodiments of the present disclosure, the size of these fields—as used by floating point logic 112—is determined by the setting currently found in the control register 119.

Depending on implementation, the setting in the control register 119 may be programmed for example by executing a put instruction which puts an immediate value into the control register 119, or a load instruction which loads a value from memory into the control register 119. In embodiments, each word of data in a portion of data to be operated on by a floating point instruction could be tagged in memory 122 with a respective setting specifying a floating point format to use for that individual word, and the program will load this setting into the relevant control register 119 when each word is loaded the register file 116, in order to have that word operated upon in accordance with the appropriate number format. In embodiments, this requires a separate put instruction to write the setting into the control register 119. Once programmed the control register may then be used for a group of registers, e.g. a group of source registers. However, it is not excluded that the instruction set could instead (or additionally) include a special kind of load instruction that loads a word of data into the operand register 118 and the tagged setting into the control register 119 at the same time all in one machine code instruction.

In embodiments, there are as many control registers 119 as there are sources (or types of sources). So for multiplication of two numbers there are two control registers, one for each source.

Figure 2:
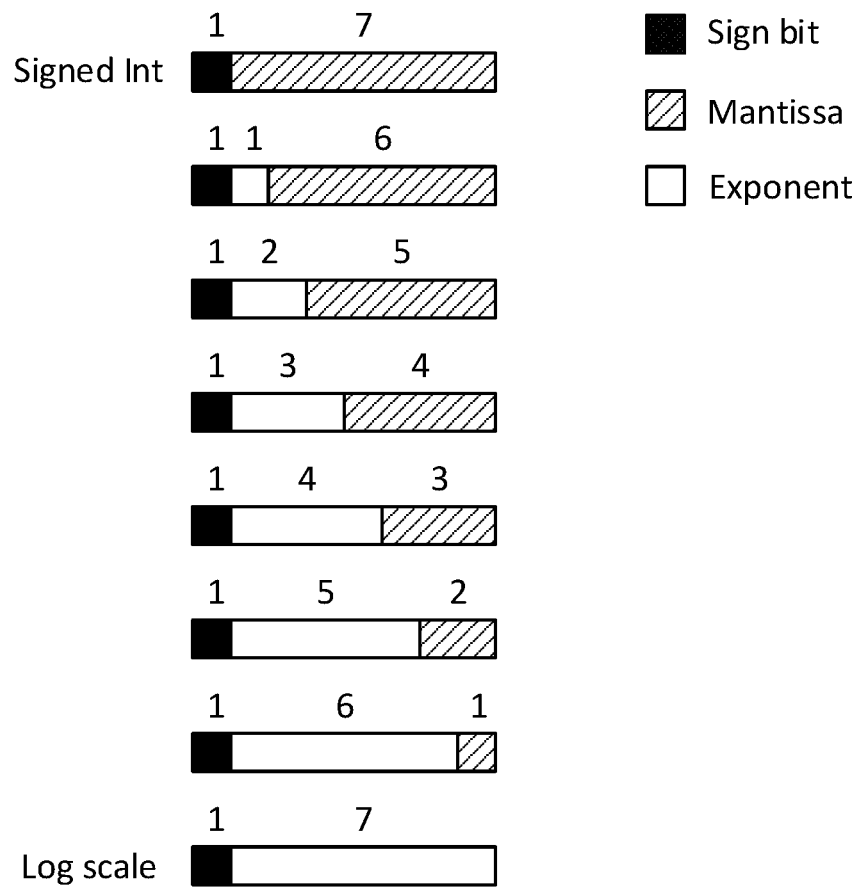

FIG. 2 shows an example of a flexible floating point number format for an 8-bit register size. The number format comprises the sign field (shown in black), the exponent field (shown in white) and the mantissa field (shown hatched). The order of these fields is a matter of design choice and does not have to be as shown here (or in principle the bits these fields could even be interleaved as long as the format was understood by the floating point logic 112). By way of illustration, and typical convention, the fields are represented in the order sign:exponent: mantissa.

The floating point logic 112 may be configurable, via the control register 119, to recognize any two or more of the variants of the floating point number format shown in FIG. 2.

The sign-field has a fixed length of a single bit. With an 8-bit register size, this leaves seven bits to represent the exponent and mantissa. These seven bits could be used to create any combination of exponent and mantissa sizes, from zero exponent bits and seven mantissa bits, to seven exponent bits and zero mantissa bits. In embodiments, the set of floating point format variants supported by the floating point logic 112 (and settable via the control register 119) may comprise any two or more of these. In some embodiments the set of supported format variants may comprise all of these, or in alternative embodiments only a subset of these.

Figure 3:
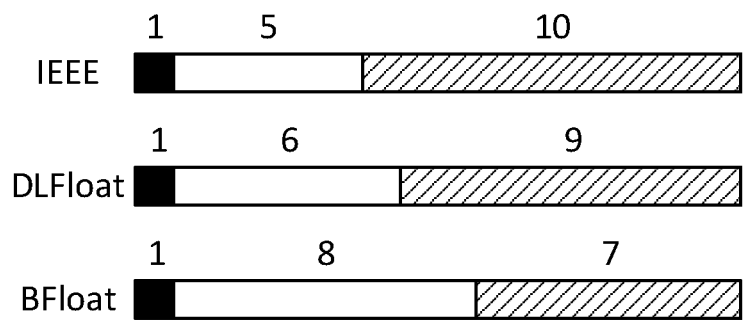

FIG. 3 shows some example format variants that may be supported with a 16-bit register size. With a 16-bit register size and single sign bit, this leaves fifteen bits to represent the exponent and mantissa. These fifteen bits could be used to create any combination of exponent and mantissa sizes, from zero exponent bits and fifteen mantissa bits, to fifteen exponent bits and zero mantissa bits. In embodiments, the set of floating point format variants supported by the floating point logic 112 (and settable via the control register 119) may comprise any two or more of these. In some embodiments the set of supported variants may comprise all of these, or in alternative embodiments only a subset of these.

As an example, in embodiments the set of supported format variants comprises two or more of the IEEE standard (1:5:10), DLFloat (1:6:9) and bfloat16 (1:8:7), thus enabling the processor to switch between two or more different standards. And/or, in some embodiments the set may comprise a non-standard format, such as 1:7:8. If implemented along with bfloat32 and DLfloat, this format may be implemented for 'free' in terms of hardware.

Similar concepts may apply, mutatis mutandis, in relation to any register size, e.g. 32-bits, 64-bits, etc.

Note that in the case of zero exponent bits the format reduces to a signed linear integer, and in the case of zero mantissa bits the format reduces to a signed exponential scale. Preferably the set of floating point format variants supported by the floating point logic 112 comprises at least one variant with both a non-zero sized mantissa field and a non-zero sized exponent field. In embodiments, the set of supported format variants may comprise at least two variants that each have a non-zero sized mantissa field and a non-zero sized exponent field. In embodiments, the set of supported format variants may comprise at least one variant with non-zero sized mantissa and exponent fields, and at least one format that has a zero sized mantissa field or a zero sized exponent field (but not both). This allows the flexible format to switch between at least one true floating point format and either a signed linear integer or a signed exponential scale.

There are a number of ways the desired format variant may be specified in the control register(s) 119, depending on implementation. One way is to explicitly specify either the mantissa field size or the exponent field size (if there are only three fields, the sign bit, mantissa field and exponent field, and that the sign field is always a single bit, then it is only necessary to specify the size of one of the mantissa or exponent field and the other will consist of the remainder of the bits of the operand register 118). So for example say it is the exponent size that is specified in the control register 119, and that the register size is 16 bits. In that case, programming a value of 5 into the control register 119 would set the floating point logic 112 to a state in which it assumes a format of 1:5:10 (sign:exponent:mantissa).

Note: it is not essential to all possible embodiments that there are three fields or only three fields in the floating point number format. Some floating point formats may have additional fields. E.g. posits (or unums) have 4 fields. Or in some alternative embodiments the floating point number field could be unsigned, in which case it does not have a sign bit field. This would be an all-positive or all-negative format with fixed, implicit sign bit. That means no bits used for the sign in the fields of the register. In further embodiments, the different supported number formats may even include at least one format that does not have a sign bit and at least one format that does.

In some embodiments, the floating point format variant may be programmable on a per-operand basis. I.e. there may be a respective independent setting in the control register(s) 119 for each of two or more different operands of a multi-operand instruction. So for example, the one or more control registers 119 comprise a first control field for setting the floating point format of a first operand of a two-operand instruction, and a second control field for independently setting the floating point format of the second operand of a two-operand instruction.

Alternatively or additionally, the floating point format variant may be programmable on a per instruction basis. I.e. there may be a respective independent setting or settings in the control register(s) 119 for each respective one of a plurality of instruction types in the instruction set of the processor 102. So for example, the one or more control registers 119 may comprise one control field for setting the floating point format of one or more operands of one instruction type, and another control field for independently setting the floating point format of one or more operands of another instruction type. E.g. this could be used to define a different format variant for MAC instructions than for simple add instructions, or such like. Where one of the instruction types in question takes multiple operands, then the control register (s) 119 could hold a single setting for the format of all the operands of that instruction type together, or a separate setting for each of some or all of the operands of that instruction type, as discussed in the previous paragraph.

Where multiple settings are required, these could be held together in one control register 119, or may span multiple control registers 119.

The flexible format can be particularly useful in applications where it is desired to combine the represented value with another value (e.g. to add or multiply them) and then store the result as a differently sized (e.g. wider) number format. For instance this could be to combine (e.g. add or multiply) two 16-bit floating point values from two respective 16-bit registers and store the result as a 32-bit floating point value in a 32-bit register. Alternatively or additionally, the flexible format can be useful where it is desired to combine (e.g. add or multiply) two values with different length formats. For example this could be to combine (e.g. add or multiply) a 16-bit floating point value with a 32-bit floating point value.

A 32 bit format can afford much larger range, with its wider mantissa field. With 16 bit formats we need to trade range with precision. In different parts of a calculation, one or the other format may be desired (if both high range and wide precision are needed, there's no choice but to use 32 bit format). Typically AI algorithms are a sum of many multiplications. so it is useful to have an 'accumulator' that has a range bigger than two multiplicands and accuracy to catch any diminishing cancellations (via addition or subtraction). It also saves space to store numbers in a smaller format; if a group of numbers have particularly short range or require less accuracy, it is possible to represent them in smaller format.

A particular application of this can occur of example in machine learning, where it may be required to multiply an activation with a weight during a forward pass, or adding a correction to a weight during training. For instance, it may be desirable that activations are only 8 or 16 bits long whilst the weights are each 16 or 32 bits long; or a correction may be 16-bits while the weight may be 16 or 32 bits long and the result may be stored as 32-bits.

Activation may be 16 bit—imagine this as digitised version of reality that is fed into the algorithm, at the first layer. E.g. this could be the pixels in a x-ray image. Weights are like knobs that are turned to correctly work out what this reality means. These could be as fine as the application needs. It may be desirable to use a fine grade in training and then down grade to smaller format in inference. So the 'master weights' may be 32 bit, but 16 bit converted versions of these are used for calculations. The weight corrections may be even finer—as these are small adjustment—during the learning itself as the algorithm progresses. And in the middle of the calculation, it may be desired to do need a deep accumulator to sum numbers up, to compare against an ideal sum. So this would also be also 32 bits.

In some embodiments, one or more other parameters of the number format, other than just the mantissa and exponent size, may be settable via the one or more control registers 119. An example would be the bias (b in the earlier formula), or potentially even the base (represented as an implicit fixed value of 2 in the earlier formula). Where multiple parameters are settable, e.g. exponent size and bias, these may be settable independently of one another via individual settings in the control register(s) 119. Alternatively they may be settable together via mode setting. E.g. so in one mode, the exponent size and bias are set to one pair of values, and in another mode, the exponent size and bias are set to another pair of values.

FIG. 4 shows an example method in accordance with embodiments disclosed herein. At step S10 the program being executed by the processor 102 writes a first setting to the control register 119, e.g. by executing a put or load instruction. At step S20 the floating point logic 112 checks the setting currently found in the control register 119, and then performs a floating point operation on one or more operands in one or more operand registers 118 in the register file 116 according to a first variant of the floating number format that is specified by the determined first setting. Step S20 may be performed in response to execution of a first floating point instruction such as a floating point add, multiply or MAC instruction, etc. At step S30 the program subsequently writes a second setting to the control register 119, e.g. by executing a put or load instruction. The second setting is different than the first. At step S40 the floating point logic 112 checks the setting now found in the control register 119, and then performs a floating point operation on one or more operands in one or more operand registers 118 in the register file 116 according to a second variant of the floating number format that is specified by the determined second setting. The second format variant is different than the first. Step S40 may be performed in response to execution of a second floating point instruction, which could be of a different type or the same type as the first floating point instruction.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A processor comprising:
   at least one register file comprising a group of operand registers for holding data values loaded from memory or to be stored back to memory, each operand register being a fixed number of bits in length for holding a respective data value of the length; and
   processing logic comprising floating point logic for performing floating point operations on data values in the at least one register file, wherein the floating point logic is configured to perform each of the floating point operations in response to execution of a single instance of a respective type of machine code instruction in an instruction set of the processor, whereby for a respective data value held in each operand register upon which one of the floating point operations is to be performed, the floating point logic is configured to process the fixed number of bits in the respective data value according to a floating point number format comprising a set of mantissa bits and a set of exponent bits;
   wherein the processing logic is operable to select a selected variant of the floating point number format from among a plurality of different variants of the floating point number format, at least some of the variants having different size sets of mantissa bits and exponent bits relative to one another;
   wherein a same one of the floating point operations, performed in response to execution of a same, single instance of a same one of said types of machine code instruction, operates on a first one of the data values from a first of the group of operand registers and on a second one of data values from a second of the group of operand registers other than the first operand register, and wherein the floating point logic is operable to apply first of the plurality of different variants of the floating point number format to the first data value in the first operand register and a second of the plurality of different variants of the floating point number format to the second data value in the second operand register as operated on by the same floating point operation;
   wherein the processor further includes a first control register for holding a first programmable setting and a second control register for holding a second programmable setting, the first programmable setting in the first control register and the second programmable setting in the second control register being programmable by one or more earlier instructions executed on the processor,
   wherein the first variant of the floating point number format applied to the first data value in the first operand register is programmable via the first programmable setting in the first control register and the second variant of the floating point number format applied to the second data value in the second programmable register is via the second programmable setting in the second control register, and
   wherein the first and second programmable settings in the first and second control registers, respectively, are programmable independently of one another, thereby enabling the first and second variants to be selected independently of one another for the same floating point operation.

2. The processor of claim 1, wherein the plurality of different variants comprise one variant where the size of the set of exponent bits is zero, and at least one other variant where both the size of the set of exponent bits is non-zero and the size of the set of mantissa bits is non-zero.

3. The processor of claim 1, wherein the plurality of different variants comprise one variant where the size of the set of mantissa bits is zero, and at least one other variant where both the size of the set of mantissa bits is non-zero and the size of the set of exponent bits is non-zero.

4. The processor of claim 1, wherein at least one of the plurality of different variants of the floating point number format further comprises a single sign bit.

5. The processor of claim 4, wherein the plurality of different variants comprise at least one variant having a single sign bit and at least one variant having no sign bit.

6. The processor of claim 4, wherein the plurality of different variants consist of all possible combinations of the sizes of the sets of mantissa and exponent bits filling the fixed number of bits with the sign bit, mantissa and exponent bits; ranging from one sign bit, zero exponent bits and the rest as mantissa bits; to one sign bit, zero mantissa bits and the rest as exponent bits.

7. The processor of claim 4, wherein the fixed number of bits in length for each operand register in the group is eight bits; and wherein the plurality of different variants consist of all possible combinations filing the fixed number of bits, from zero exponent bits and seven mantissa bits, to zero mantissa bits and seven exponent bits.

8. The processor of claim 4, wherein the fixed number of bits in length for each operand register in the group is sixteen bits; and wherein the variants comprise two of more of the following:
   five exponent bits and ten mantissa bits,
   six exponent bits and nine mantissa bits,
   seven exponent bits and eight mantissa bits, and/or
   eight exponent bits and seven mantissa bits.

9. The processor of claim 4, wherein according to the floating point number format the respective value in binary is defined as:

$$(-1)^S \times (M+1) \times 2^{(E-b)},$$

where S is the sign bit, M is the mantissa, E is the exponent, and b is a bias.

10. The processor of claim 9, wherein at least some of the plurality of different variants of the floating point number format have different bias values from one another.

11. The processor of claim 1, wherein at least one of the floating point operations comprises at least one item selected from a list consisting of:
   combining the respective data value with a value from another register, wherein the other register has a different size than a fixed length of the operand registers in the group; and
   placing a result of the operation in a further register having a different size than the fixed length of the operand registers.

12. The processor of claim 1, wherein the floating point logic is operable to apply a different one of the plurality of different variants of the floating point number format to the data values operated on by at least some different ones of the types of machine code instruction.

13. The processor of claim 12, further comprising at least one control register for holding one or more programmable settings, wherein a selected one of the variants of the floating point number format is specified by at least one of the programmable settings as determined from the at least one control register;
   wherein the variants of the floating point number format for the data values of the different types of machine code instruction are programmable via the settings in the at least one control register.

14. The processor of claim 1, programmed to use one of the first and second data values to represent a weight of a neural network.

15. The processor of claim 14, wherein said same floating point operation comprises:
   combining the first and second data values held in the first and second operand registers with a value from a further register, wherein the further register has a different size than a fixed length of the operand registers in the group; and
   wherein the system is programmed to use the value in the further register to represent an activation of a node of the neural network.

16. The processor of claim 1, wherein the plurality of different variants consist of only a subset of possible combinations of the sizes of the sets of mantissa and exponent bits within the fixed number of bits.

17. The processor of claim 1, wherein the fixed number of bits in length for each operand register in the group is eight bits.

18. The processor of claim 1, wherein the fixed number of bits in length for each operand register in the group is sixteen bits.

19. A method of operating a processor, the method comprising:
   using at least one register file comprising a group of operand registers to hold data values loaded from memory or to be stored back to memory, each operand register being a fixed number of bits in length;
   using processing logic comprising floating point logic to perform floating point operations on a first one of the data values in the at least one register file, whereby for the first one of the data values held in a first one of the operand registers, the floating point logic operations process the fixed number of bits in the first one of the data values according to a floating point format comprising a set of mantissa bits and a set of exponent bits, wherein the floating point logic performs each of the floating point operations in response to execution of a single respective instance of a respective type of machine code instruction in an instruction set of the processor; and
   selecting among a plurality of different variants of the floating point format, at least some of the variants having different size sets of mantissa bits and different size sets of exponent bits relative to one another;
   wherein a same one of the floating point operations, performed in response to execution of a same, single instance of a same one of said types of machine code instruction, operates on the first one of the data values held in a first one of the operand registers and on a second one of the data values held in a second one of the operand registers other than the first operand register, and wherein the same floating point operation includes applying a first of the variants of the floating point number format to the first data value in the first operand register and a second of the variants to the second data value in the second operand register;
   programming a first programmable setting in a first control register and programming a second programmable setting in a second control register,
   wherein the first variant of the floating point number format applied to the first data value as held in the first operand register is programmable via the first programmable setting in the first control register and the second variant of the floating point number format applied to the second data value as held in the second operand register is programmed via the second programmable setting in the second control register, and
   wherein the first and second programmable settings select the first variant of the floating point number format for the first data value in the first operand register and the second variant of the floating point number format for the second floating point data value in the second operand register independently of one another for the same floating point operation.

* * * * *